United States Patent [19]
Wakamatsu et al.

[11] 3,809,029
[45] May 7, 1974

[54] ELECTRIC CONTROL APPARATUS FOR INTERNAL COMBUSTION ENGINES

[75] Inventors: Hisato Wakamatsu, Kariya; Kunio Endo, Anjo, both of Japan

[73] Assignees: Toyota Jidosha Kogyo Kabushiki Kaisha, Toyota-shi; Nippondenso Co., Ltd., Kariya-shi, both of, Japan

[22] Filed: Dec. 21, 1971

[21] Appl. No.: 210,322

Related U.S. Application Data

[63] Continuation-in-part of Ser. No. 1,687, Jan. 9, 1970, abandoned.

[52] U.S. Cl. ...... 123/32 EA, 123/119 R, 123/148 E, 123/117 R
[51] Int. Cl. ........................................... F02m 51/00
[58] Field of Search ...................... 123/32 EA, 119

[56] References Cited
UNITED STATES PATENTS
3,020,897   2/1962   Sekine et al. .................... 123/32 EA
FOREIGN PATENTS OR APPLICATIONS
2,004,269   8/1970   Germany ....................... 123/32 EA Primary Examiner—Laurence M. Goodridge
Attorney, Agent, or Firm—Cushman, Darby & Cushman

[57] ABSTRACT

An electronic control for the fuel injection valves or ignition timing of an internal combustion engine senses a plurality of pulses generated throughout each engine cycle including a reference pulse for each cycle. Pulses are fed to a speed load, etc., voltage conversion circuits and a plurality of counting circuits for each fuel injection valve. The counters supply an output starting signal depending on the capacity of each counter. A timing correction circuit connected to each counter determines capacity depending on engine speed, load, etc., represented by voltage from the conversion circuit to modify the duration of an electro-magnetic valve driving pulse, or trigger an ignition, for, or at, a certain time determined by the output starting signal and counter input frequency from the pulse generator.

11 Claims, 13 Drawing Figures

ELECTRIC CONTROL APPARATUS FOR INTERNAL COMBUSTION ENGINES

CROSS REFERENCE TO RELATED APPLICATIONS

This is a continuation-in-part application of our earlier copending U.S. application Ser. No. 1,687 filed on Jan. 9, 1970 now abandoned.

BACKGROUND OF THE INVENTION

1. Field of the Invention

The present invention relates to an electric control apparatus for internal combustion engines and more particularly to a control apparatus adapted for electrical fuel injection control and for ignition control of an internal combustion gasoline injection type of engine.

2. Description of the Prior Art

Heretofore, the fuel injection timing function and the ignition timing function for internal combustion engines have both been controlled independently of each other by the use of individual signal sources and actuation means, or otherwise one has utilized signals generated by the other's signal source.

Such a conventional system as is mentioned above employs a switch contained in a distributor which is independent of the actual ignition system distributor contacts, as a signal source to produce a fuel injection signal and for controlling the ignition timing. It is well known that in order to effectively inject fuel approximately in synchronism with the opening of the intake valve of each cylinder it is necessary to effect fuel injection slightly in advance of the opening of the intake valve as the engine speed is increased. Although the just discussed conventional system, which employs the switch, also includes a conventional mechanism for controlling the fuel injection timing according to the engine speed to take this factor into account in injection timing, it has the disadvantages of having a complicated structure, poor reliability and an unwarranted large size.

Where fuel injection is performed in synchronism with the opening time of the intake valve of each cylinder, since there is a certain finite distance between the nozzle and the intake valve, the flow of air to be suctioned is affected by inertia thereof and the actual resulting time required for the suction is not constant for different engine speeds. For example, the flow speed of the mixed air to be suctioned does not necessarily become faster with an increase in the engine speed. Therefore, when the engine speed is high, the fuel injection time must be made to occur somewhat earlier as should be apparent to those in the art.

In another conventional system in which the fuel injection signal is obtained indirectly from apparatus which also produces the ignition timing signal, it has been found that although the angle of ignition advance is controlled according to the engine speed and the negative intake manifold pressure, the desired ignition timing correction factor or angle of advance is not necessarily in the same direction as the direction of the desired control for the fuel injection timing according to engine speed. Therefore, fuel injection timing control as a function of the engine speed in this system tends to become improperly effected due to this undesirable influence of the angle of ignition advance. Furthermore, the signal source or pulse generator for controlling the ignition timing in such prior systems comprises mechanical means such as a governor and diaphragm mechanism provided in a distributor mounted on the engine. Such mechanical means have been found to be disadvantageous in that they have complicated structures, and mechanical sliding portions and have a poor service life period.

SUMMARY OF THE INVENTION

It is, therefore, an object of the present invention to provide an electric control apparatus for internal combustion engines which utilizes a negative pressure-voltage conversion circuit for converting the negative pressure of an engine intake manifold into voltage corresponding thereto, a pulse generator for sequentially generating pulses throughout each cycle of the engine in synchronism with the crankshaft revolution of the engine, said pulses containing only one reference pulse having a different pulse width during each engine cycle, an engine speed-voltage conversion circuit for generating a voltage corresponding to the engine speed in response to the output pulses of the pulse generator, and a plurality of counting circuits each corresponding to an electromagnetic valve provided in each cylinder.

It is another object of the present invention to provide an electric control apparatus for internal combustion engines, as above, further utilizing an injection timing correction circuit for determining the time at which the electromagnetic fuel injection valves are energized, the energization of said electromagnetic valves being made when a corresponding counting circuit therefor counts a predetermined number of said output pulses occurring after the reference pulse, an electromagnetic valve actuation circuit for applying a pulse whose width is related to the time duration during which fuel is to be injected by a corresponding electromagnetic fuel injection valve responsively to the output signal of the corresponding injection timing correction circuit counter, and a plurality of further counting circuits each corresponding to an ignition plug mounted on each cylinder for generating ignition timing pulses.

It is still another object of the present invention to provide an electric control apparatus for internal combustion engines, as above, further utilizing an angular-advance-of-ignition correction circuit for determining the time at which said ignition plugs are ignited, the ignition of said ignition plugs being made when the counting circuits therefor count a predetermined number of the output pulses from said pulse generator, and an ignition plug actuation circuit for applying the output signal of said angular-advance-of-ignition correction circuit to the corresponding ignition plugs.

In accordance with one feature of the present invention, the predetermined number of the output pulses counted by the counting circuits for said injection timing correction circuit is controlled by the output signal of said engine speed-voltage conversion circuit so that the injection timing may be controlled faithfully according to the engine speed.

In accordance with another feature of the present invention, the predetermined number of the output pulses counted by said counting circuits for said angular-advance-of-ignition correction circuit is controlled by the output signals of said negative pressure-voltage conversion circuit and said engine speed voltage conversion circuit so that the ignition timing and the angle of advance of ignition may be faithfully controlled according to the negative pressure of the engine intake manifold and the engine speed.

In accordance with still another feature of the present invention, the pulse width of the pulse generated by said electromagnetic valve actuation circuit is controlled by the output signals of said negative pressure-voltage conversion circuit and said engine speed voltage conversion circuit so that the time duration during which the fuel is injected may be controlled according to the negative pressure of the engine intake manifold and the engine speed.

In accordance with further features of the present invention, the single pulse generator functions as a signal source which generates both the injection control signal and the ignition control signal without any interference with each other, and the above system has no mechanical sliding portions, which provides a remarkably long service life with increased reliability.

BRIEF DESCRIPTION OF THE DRAWINGS

FIG. 4b shows a waveform of the output of the reference pulse discriminating circuit of FIG. 4a.

DESCRIPTION OF THE PREFERRED EMBODIMENT

Figure 1:
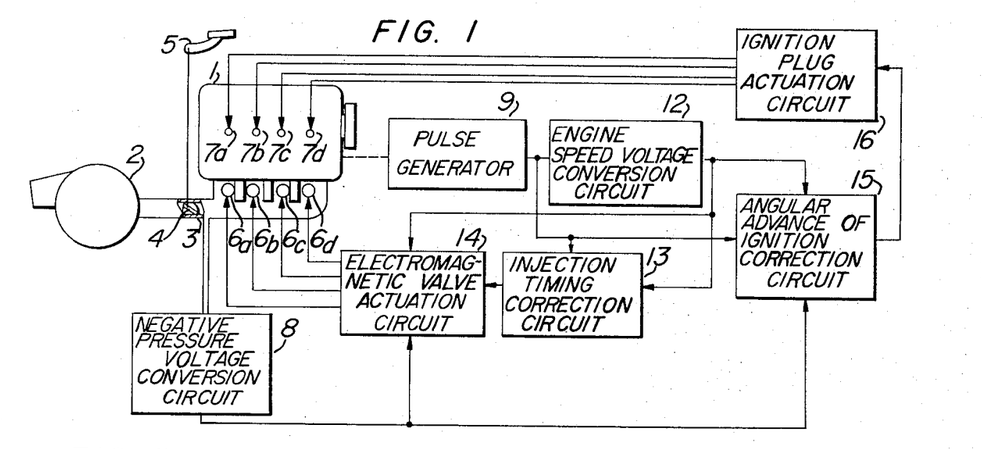
FIG. 1 is a block diagram showing one exemplary embodiment of an electric control apparatus for internal combustion engines according to the present invention.
Figure 2:
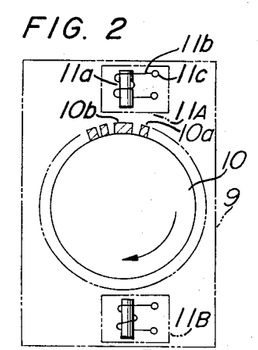
FIG. 2 is a schematic view showing one exemplary embodiment of a pulse generator employed in the present exemplary apparatus.

Referring to the drawings and more particularly to FIGS. 1 and 2 thereof, an internal combustion engine to which the present control apparatus is applicable comprises a four-cylinder gasoline injection engine 1, an air cleaner 2, an intake manifold 3 adapted to feed air cleaned by the air cleaner 2 to each cylinder, and a throttle valve 4 provided in the intake manifold 3, the throttle valve 4 being opened by depressing an accelerator pedal 5.

Electromagnetic fuel injection valves 6a, 6b, 6c and 6d for controlling the amount of the fuel to be injected are disposed in the intake manifold 3 adjacent to the respective intake valves of the first, second, third and fourth cylinders. Ignition plugs 7a, 7b, 7c and 7d are mounted in the first, second, third and fourth cylinders, respectively.

A negative pressure voltage conversion circuit 8 is employed by which the negative pressure of the engine intake manifold 3 is converted firstly into a frequency, which is then converted into a voltage that is inversely proportional to the negative pressure of the engine intake manifold 3.

That is, the negative pressure controls a frequency sensitive parameter such as an L or C component varied by a diaphragm mechanical connection in an oscillator circuit to produce an output signal having a frequency which varies in response to variations in negative pressure as will be apparent to those skilled in the art. Then, this variable frequency output signal is converted to a corresponding voltage that is inversely proportional to the negative pressure by a conventional frequency-to-voltage conversion circuit (for instance a tuned circuit plus detection diodes) as will be apparent to those skilled in the art.

A pulse generator 9 functions to generate a sequence of pulses throughout an entire engine cycle of 720 crank angle ° synchronously with the revolution of the engine the sequence of pulses containing only one reference pulse whose pulse width differs from that of other pulses during each engine cycle. An exemplary construction of the pulse generator 9 is shown in FIG. 2 in which a disc 10 mechanically connected to, for example, the cam shaft of the engine rotates through one revolution in response to 720 crank angle ° corresponding to one complete cycle of the engine 1 and comprising the suction stroke, compression stroke, expansion stroke, and exhaust stroke as should be apparent. The disc 10 has provided around the periphery thereof 720 rectangular projections 10a and 10b each corresponding to each one degree of the 720 crank angle °. These rectangular projections all have the same width except for one projection 10b having a different width to produce the reference pulse.

Figure 3:
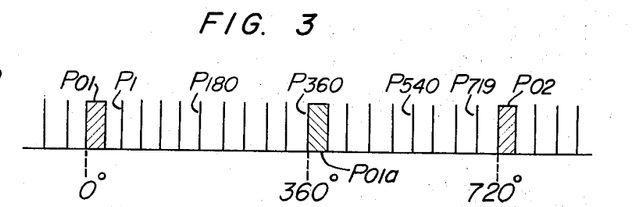
FIG. 3 shows a pulse waveform of the output pulses generated by the pulse generator of FIG. 2.

A pair of pick up devices 11A and 11B are disposed near the periphery of the disc 10, 360 crank angle degrees apart from each other, and each comprises a permanent magnet 11a, a coil 11b wound on the permanent magnet 11a and output terminals 11c. When the projections 10a and 10b cross the magnetic field produced by the coil 11a, a sequence of pulses are generated across the output terminals 11a which, after conventional wave shaping (as will be apparent to those skilled in the art), will appear as shown in FIG. 3, in which $P_{o1}$ and $P_{o1a}$ are reference pulses generated by the pair of pick up devices 11A and 11B respectively. Of course, since the pulse generated by the projection 10b of a broad tooth has a larger amplitude than that generated by the projection 10a, the shaped pulse corresponding to the larger amplitude pulse has a relatively broad pulse width.

Figure 6:
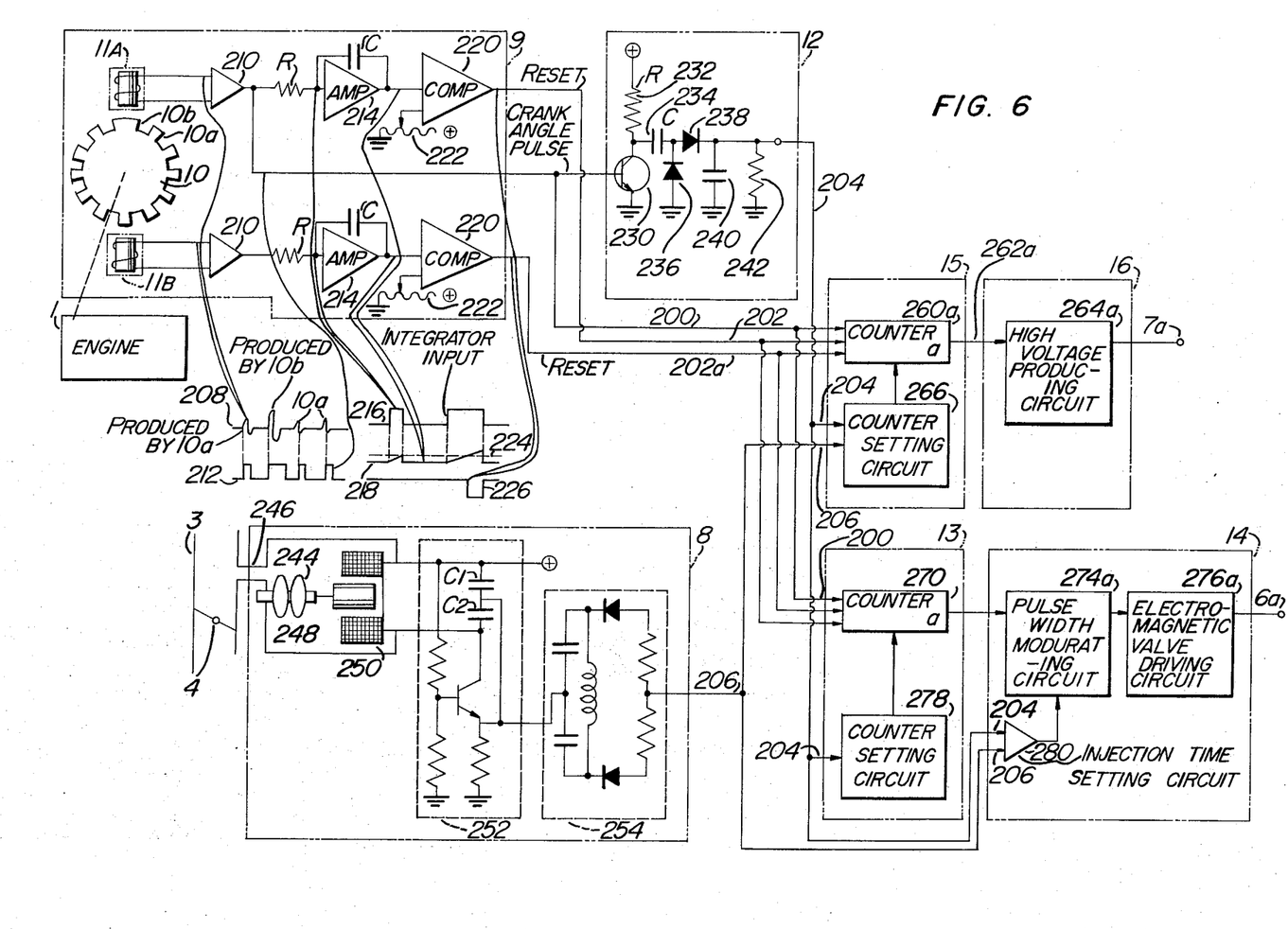
FIG. 6 is a more detailed schematic diagram of the exemplary embodiment of FIG. 1 in which the circuit for the first cylinder of a four-cylinder engine is shown.

That is, the pulse generator 9 having the pair of pick up devices 11A and 11B produces a crank angle pulse signal for counting and also produces a reset pulse once each engine cycle for the fuel injection timing and for the ignition timing. As regards producing of the reset pulse, the reset pulse can be identified in accordance with the pulse width thereof as shown in the exemplary embodiment or by other techniques as will be appreciated by those skilled in the art. Output pulses generated by projections 10a and 10b have different waveforms respectively (as shown in FIG. 6 as the output of pick up devices 11A and 11B). The output pulses are applied to a waveform shaping circuit to produce rectangular pulses having different widths as shown in FIG. 3. The identification of the reset pulse may be made, for example, by such circuit as shown in FIG. 6 in which circuit arrangement a pulse width-voltage conversion circuit and a comparator are contained in combination.

The pick up devices 11A and 11B in FIG. 6 produce reset signals, for example in such a manner, in which the pick up device 11A produces a reset signal for starting counting at counter 260a and a reset signal for presetting counter 270a, whereas the pick up device 11B produces a reset signal for starting counting at 270a and a reset signal for presetting counter 260a.

Designated at 12 is an engine speed-voltage conversion circuit which generates a voltage related to the engine speed in response to the output signal of the pulse generator 9.

An injection timing correction circuit 13 includes a plurality of counting circuits each corresponding to the electromagnetic valves 6a, 6b, 6c and 6d respectively, and a counter setting circuit (as should be apparent) for individually presetting each counter in accordance with a signal from an engine speed-voltage conversion circuit 12 such that each counter will be preset to count a predetermined number of input pulses before providing an output when its contents have reached the counter's capacity or at some other predetermined counter contents as will be apparent to those skilled in the art. The counting circuits are adapted to count the number of the output pulses from the pulse generator 9, and when the counting circuits count a predetermined number of the output pulses they generate electric signals to energize the respective electromagnetic valves.

Figure 9:
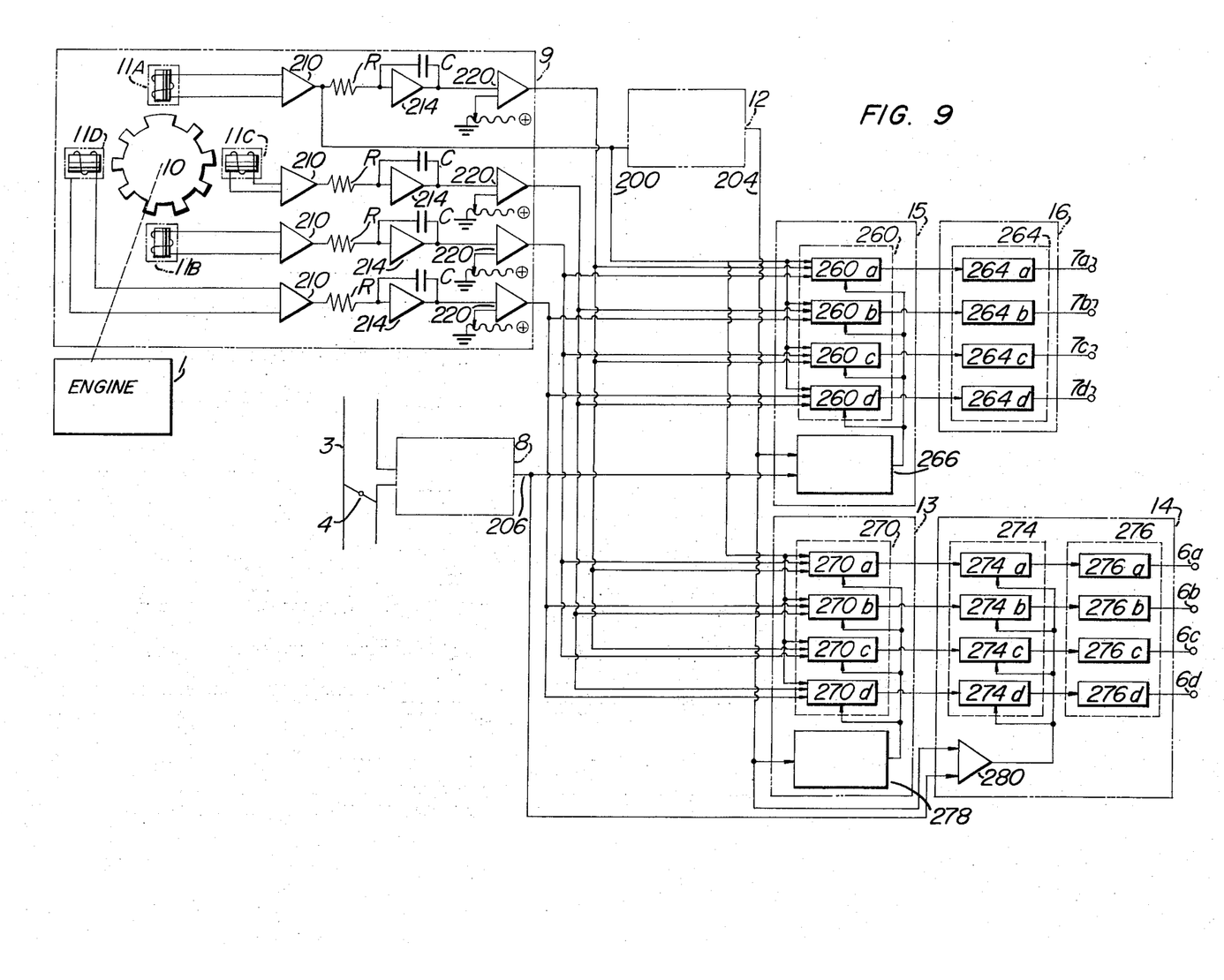
FIG. 9 is a more detailed schematic diagram of exemplary counter circuits for use in the exemplary embodiment, in which the counter circuits are shown for a four-cylinder engine.

An example of an actual circuit arrangement for an exemplary engine speed-voltage conversion circuit 12 is shown in FIGS. 6 and 9. The engine speed is obtained by amplifying pulses produced by 10a . . . 10b and then a digital to analog conversion is carried out. Accordingly when the engine speed is increased (and hence the number of pulses per unit time interval increases), the output voltage potential from the digital-to-analog converter becomes higher as should be apparent to those in the art.

An electromagnetic valve actuation circuit 14 generates, responsively to the output signals from the injection timing correction circuit 13, fuel injection pulses to be applied to the corresponding electromagnetic valves 6a, 6b, 6c and 6d and having a pulse width related to the time duration during which the fuel is to be injected.

Indicated at 15 is an angular-advance-of-ignition correction circuit having a plurality of counting circuits each corresponding to the ignition plugs 7a, 7b, 7c and 7d. The counting circuits function to count the number of the output pulses from the pulse generator 9, and when a predetermined number of the output pulses have been counted, generate electric signals to energize the corresponding ignition plugs. Similar to the injection timing circuit, the angular-advance-of-ignition correction circuit includes counter setting circuits for presetting the individual counters to count predetermined numbers of pulses before providing an output signal to trigger ignition in the corresponding engine cylinder. Here, however, the presetting takes into account both engine speed and negative manifold pressure.

An ignition plug actuation circuit 16 includes high voltage producing circuits similar to those usually used in ignition systems and applies the high voltage output signal to the corresponding ignition plugs 7a, 7b, 7c and 7d in accordance with the ignition signal supplied from the angular-advance-of-ignition correction circuit 15.

It is to be noted that since the output voltage of the engine speed-voltage conversion circuit 12 is applied to the injection timing correction circuit 13, the predetermined number of the output pulses counted by the counting circuits for the injection timing correction circuit 13 varies depending upon the engine speed. In other words, an optimum injection timing is determined based on the engine speed.

Furthermore, it is to be noted that since the output voltages of the negative pressure-voltage conversion circuit 8 and the engine speed-voltage conversion circuit 12 are applied to the angular-advance-of-ignition correction circuit 15, the predetermined number of the output pulses counted by the counting circuits for the angular-advance-of-ignition correction circuit 15 depends on both the negative pressure of the engine intake manifold 3 and the engine speed. That is, the optimum ignition timing and angular-advance-of-ignition are determined based on the negative pressure of the engine intake manifold 3 and the engine speed.

Still furthermore, it should be noted that since the output signals of the negative pressure-voltage conversion circuit 8 and the engine speed-voltage conversion circuit 12 are applied to the electromagnetic valve actuation circuit 14, the pulse width of the pulse generated by the electromagnetic valve actuation circuit 14 and accordingly the time duration during which the fuel is injected are determined based on the negative pressure of the engine intake manifold 3 and the engine speed.

The relationship between the pulses generated by one pair of the pair of pick up devices, e.g., a pick up device 11A, appearing at the output terminals 11c of the pulse generator 9 and the crank angle is shown in FIG. 3 in which pulses $P_1 \ldots P_{719}$ correspond to those generated by the projections 10a and pulses $P_{01}$ and $P_{02}$ to the reference pulses generated by the projections 10b. The reference pulses $P_{01}$ and $P_{02}$ differ from the other pulses in that they have a larger pulse width than the other pulses.

The reference pulses $P_{01}$ and $P_{02}$ are preset at reference points, for example, to be produced when the piston comes to the bottom dead center during the explosion stroke, while the reference pulse $P_{01a}$ is preset to be produced when the piston comes to the bottom dead center during the compression stroke. And, the time interval of the reference pulses $P_{01}$ and $P_{02}$ is set 720 degrees in terms of the crank angle, the pulses $P_1 \ldots P_{719}$ being generated each one degree of the crank angle.

Figure 4A:
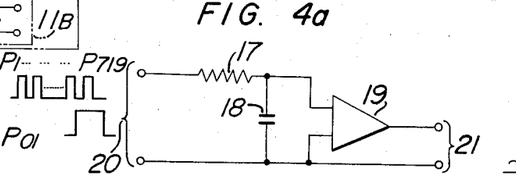
FIG. 4a is a circuit diagram of an exemplary reference pulse discriminating circuit employed in the present exemplary apparatus.
Figure 4B:
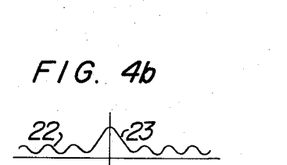

Referring to FIG. 4a, a pulse discriminator circuit which constitutes one component of the pulse generator 9 comprises an integrating resistor 17, an integrating capacitor 18, an amplifier 19, input terminals 20 connected to the output terminals 11c of the pick up device 11A (or 11B), and output terminals 21. The pulse discriminator circuit functions to discriminate between the output pulses $P_1 \ldots P_{719}$ and the reference pulses $P_{01}$ and $P_{02}$ from the pulse generator 9 (FIG. 3), and when the output pulses $P_1 \ldots P_{719}$ and the reference pulses $P_{01}$ and $P_{02}$ are applied across the input terminals 20, the output obtained at the output terminal 21 has the wave-form as shown in FIG. 4b, generally comprising two portions 22 and 23 corresponding to the output pulses and the reference pulses, respectively. Accordingly, the bottom dead center of the piston during the explosion stroke is detected by the difference in level between the output signals 22 and 23 whereby the reset operation of the counting circuits for the injection timing correction circuit 13 and the ignition timing correction circuit 15 is properly performed.

Figure 5A:
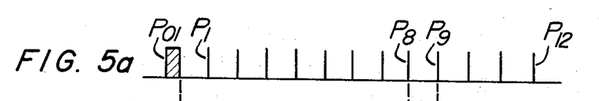
FIGS. 5a, 5b and 5c are time charts for the output pulses counted by the counting circuits, being used here for illustrating the operation of the present exemplary apparatus.
Figure 5B:
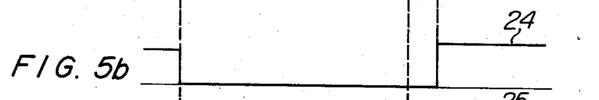

FIG. 5a shows the output pulses from the pulse generator 9 for example, in connection with the pick up device 11A, and FIG. 5b shows the manner in which the electromagnetic valve, for example, 6a is energized in response to the counting of the predetermined number of the output pulses by the corresponding counting circuit for the injection timing correction circuit 13. Specifically, the counting circuit is reset by the application of the reference pulse $P_{01}$ to the input terminal 20 of the discriminator circuit, and after counting the predetermined number of the output pulses, for example, nine pulses, $P_1 \ldots P_9$, applies a fuel injection initiation signal 24 to the following electromagnetic valve actuation circuit 14.

Figure 5C:
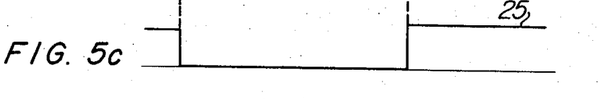

Furthermore, FIG. 5c shows the case in which the predetermined number is changed from 9 to 8 by the action of the output signal of the engine speed-voltage conversion circuit 12 when the engine speed is increased. In this case the counting circuit applies the fuel injection initiation signal 25 when it counts eight pulses $P_1 \ldots P_8$.

The operation of the electric control apparatus according to the present invention is as follows: As has been described above, the reference pulse $P_{01}$ is set at the bottom dead center during the explosion stroke, and thus, in a four stroke cycle engine the 180th pulse from the reference pulse $P_{01}$ coincides with the top dead center of the piston during the suction stroke. Accordingly, during the idle running operation of the engine 1, when the fuel injection is assumed to be effected 5° in advance of the top dead center taking into consideration the time lag for the arrival of the fuel at the intake valve, the predetermined number of the counting circuit of the first cylinder is set to 175 so that the fuel injection is effected in response to the arrival of output pulses $P_{175}$.

On the other hand, since the reference pulse $P_{01a}$ is set at the bottom dead center during compression stroke, the ignition timing is assumed to be 12 degrees in advance of the top dead center during the compression stroke, since during the idle running operation of the engine 1 the throttle valve 4 is almost fully closed so that the negative pressure developed in the intake manifold 3 is extremely high. Accordingly, the predetermined number of the counting circuit of the angular-advance-of-ignition correction circuit 15 corresponding to the first cylinder is preset so that the ignition of the corresponding ignition plug is initiated in response to the reception of the 168th pulse from the reference pulse $P_{01a}$ (which corresponds to the 528th pulse from the reference pulse $P_{01}$).

When the engine 1 is accelerated by depressing the accelerator pedal 5, the negative pressure of the engine intake manifold 3 drops with the resultant increase in the output voltage of the negative pressure-voltage conversion circuit 8. This would increase the pulse width of the fuel injection pulse generated by the electromagnetic valve actuation circuit 14 which receives the output signal of the negative pressure-voltage conversion circuit 8. The result is that the time duration in which the fuel is injected becomes longer so that a larger amount of fuel is supplied to the cylinder.

This would invite an increase in the engine speed, which, in turn, requires fuel to be injected at an earlier time. Thus, assuming that the fuel injection is effected a further 2° in advance when the engine speed is increased to 2,000 r.p.m., the predetermined number of the counting circuit of the injection timing correction circuit 13 corresponding to the first cylinder is changed from 175 to 173, so that when the counting circuit counts the 173rd pulse the fuel injection is initiated. Furthermore, the increase in the engine speed would make larger the pulse width of the fuel injection pulse generated by the electromagnetic valve actuation circuit 14 which receives the output signal of the engine speed-voltage conversion circuit 12.

The angular-advance-of-ignition correction circuit 15 functions to generate an ignition signal at an earlier time as the negative pressure of the engine intake manifold 3 is increased. Accordingly, when the accelerator pedal 5 is depressed so that the negative pressure drops, no advance of angle of ignition due to the development of the negative pressure in the intake manifold 3 is made. When the advance of angle of ignition due to the engine speed at that particular moment is assumed to be 5° in advance of the top dead center, the predetermined number of the counting circuit of the angular-advance-of-ignition correction circuit 15 corresponding to the first cylinder from the reference pulse $P_{01a}$ is 175 so that when the counting circuit receives the 175th pulse it generates an ignition signal.

When both the engine speed and the negative pressure of the engine intake manifold 3 are increased, the advance of angle of ignition increase to, for example 20° in advance of the top dead center by the action of the output signals from the engine speed-voltage conversion circuit 12 and the negative pressure-voltage conversion circuit 8, so that when the counting circuit receives the 160th pulse (from the reference pulse $P_{01a}$) it generates an ignition signal. As described above, the optimum fuel injection timing and ignition timing can be obtained by the action of the output signals from the negative pressure-voltage conversion circuit 8 and the engine speed-voltage conversion circuit 12.

Although the description of the invention has been made in connection with the first cylinder, it should be appreciated that the description can also be applied to the second, third, and fourth cylinders in which fuel injections are effected at equal intervals, and if the sequence of the fuel injections is such that the first, second, third and fourth cylinders receive the fuel in order, the fuel injection and ignition control in the second, third and fourth cylinders is effected 180, 360 and 540° behind that of the first cylinder, respectively. FIG. 9 shows a schematic diagram of the counter circuits for a four-cylinder engine, in which as compared with FIG. 6, four pick up devices 11A, 11B, 11C and 11D are illustrated for four cylinders, and each pick up device not only functions for one cylinder but also functions for another cylinder. For example, the pick up device 11A produces signals such as; a reset signal for starting counting at counter 260a, a reset signal for starting presetting at counter 270a, a reset signal for starting counting at counter 270c, and a reset signal for starting presetting at counter 260c. The pick up device 11B also produces signals such as; a reset signal for counting at counter 260c, a reset signal for presetting at counter 270c, a reset signal for counting at counter 270a, and a reset signal for presetting at counter 260a. The pick up devices 11C and 11D produce signals in a similar manner.

Although the concept of the present invention has been explained in connection with a four-stroke cycle engine in which one cycle of suction, compression, expansion and exhaust strokes is completed throughout 720 crank angle °, similar fuel injection and ignition control can be effected in a two stroke engine in which the one cycle is completed throughout 360 crank angle °, by generating a sequence of pulses throughout 360 crank angle ° by the use of a pulse generator 9, the sequency of pulses containing only one pulse having a different pulse width, and by properly setting the predetermined numbers of the counting circuits of the fuel injection timing correction circuit 13 and the angular-advance-of-ignition correction circuit 15.

Although in the exemplary embodiment hereinbefore described the disc 10 of the pulse generator 9 has provided around the periphery thereof 720 projections 10a and 10b for generating one pulse each 1° of the crank angles of 720°, 1,440 projections, namely, one each 0.5 degrees can be provided around the periphery of the disc 10 so as to provide higher accuracy for adjustment of the fuel injection timing and ignition timing. This concept can also be applied to the two stroke engine described above as should be apparent.

Furthermore, it is possible to construct disc 10 of the pulse generator 9 so as to have a plurality of holes adjacent to the periphery of the disc 10, said holes being optically coupled with a light source and a phototransistor or other photoconductive element which are positioned on the respective sides of the disc, said photo-transistor or other photo-conductive element being adapted to detect the amount of light passing through the holes for generating a sequence of pulses throughout the crank angle as should be apparent.

Since gas-pressure (or vacuum) to voltage converter circuits, frequency-to-voltage converter circuits, counting circuits fuel injection valve actuator circuits and ignition plug high voltage circuits, per se, are all well known in the art (many are off-the shelf items as standard integrated circuit components for example) it is believed that the foregoing is completely sufficient to teach those skilled in the art to practice and use the novel control apparatus of this invention. However, to provide an even more explicit teaching, the exemplary system of FIG. 1 is shown in greater detail at FIGS. 6 − 8 where the same reference numerals have been used to denote corresponding elements.

To drive the various counters in the ignition correction circuit 15 and the fuel injection correction circuit 13, basically five different kinds of input signals are utilized. There are crank angle pulses occurring on line 200; reset pulses occurring on lines 202 and 202a; an engine speed voltage on line 204 and an intake manifold vacuum voltage on line 206. The crank angle pulses and reset pulses are both produced by the pulse generator 9 while the engine speed voltage is produced by the digital to analog converter 12 and the intake manifold vacuum voltage is produced by the voltage conversion circuit 8.

The crank angle pulses are initiated by the passage of projections 10a . . . 10b past the pick-ups 11A and 11B. The projections can be magnetized or alternatively the core of the pick-ups 11A and 11B can be magnetized to detect changes in magnetic reluctance or magnetic fields as the projections pass thereby if desired. In any event, a voltage will be developed in the coils of pick-ups 11A and 11B proportional to the time rate of change of the magnetic flux linked therethrough. A typical waveform of the output from pick-up 11 is shown as waveform 208. It will be noted that the pulse produced by projection 10b has a longer time duration than those produced by projections 10a. Waveform 208 is then inputted to conventional wave shaping and amplifying circuits 210 to produce the crank angle pulses shown as waveform 212 at the output thereof. Typically, the wave shaping and amplifying circuits 210 would comprise conventional amplifier circuits together with Schmidt triggers, etc., as should be apparent to those skilled in the art. Any conventional circuitry may be used for forming the square rectangular pulses 212 from the waveform 208 as should be apparent.

To develop the reset pulse on line 202 and 202a, the wider pulse produced by 10b must be discriminated from the narrower pulses produced by projections 10a to produce a reset pulse once each engine cycle as the projection 10b passes under pick ups 11A and 11B. One way to perform this function is shown in FIG. 6 wherein the crank angle pulses are input to an integrator stage comprising an amplifier 215 connected in the usual Miller integration type of circuit having capacitance feedback. The integrator input (i.e., the crank angle pulses) are shown as waveform 216 while the output from the Miller integrator is shown as waveform 218. As will be apparent, the peak integrator output level is proportional to the input pulse width for any given pulse. Accordingly, when the integrator output is presented to a comparator 220 for comparing with a predetermined comparator level input selected by potentiometer 222, the higher input ramp signals corresponding to the reference or wider pulses may be detected as will be apparent. Thus, whenever the waveform 218 rises above the comparator level input (shown as dotted waveform 224), the comparator changes its output abruptly to produce a reset pulse shown as waveform 226 and which is then output on line 202 (202a).

Assuming then, as previously explained for the exemplary embodiment, that there are 720 projections in all on wheel 10 and that the wheel 10 is driven through one complete revolution for each complete engine cycle of engine 1, then there will be 720 crank angle pulses on line 200 for each complete engine cycle. Furthermore, one of those crank angle pulses during each engine cycle will be produced by projection 10b and therefore be of longer time duration than the other crank angle pulses. This longer duration reference pulse will then be detected by the integrator 214 and comparator 220 to produce one reset pulse on line 202 and on line 202a respectively for each engine cycle as should now be apparent.

Since the crank angle pulses occur at a frequency proportional to engine speed, all that is needed to derive an engine speed voltage proportional to the actual engine speed is to convert the frequency or repetition rate of the crank angle pulses into a DC voltage proportional thereto. Such a digital-to-analog converter 12 is shown in FIG. 6. Here, the crank angle pulses are input to a conventional grounded emitter transistor amplifier circuit comprising transistor 230 and resistor 232. The AC output is coupled through capacitor 234. Negative signal excursions are clamped by diode 236 while the positive excursions are rectified by diode 238 and smoothed by capacitor 240 and resistor 242 as should be apparent to those in the art. The result is a DC voltage on line 204 proportional to the engine speed.

A voltage proportional to the intake manifold vacuum is produced on line 206 by a voltage conversion circuit 8. A conventional bellows transducer 244 is connected to the intake manifold 3 downstream of the throttle valve 4 to convert the magnitude of the intake manifold vacuum into a mechanical movement as should be apparent to those in the art. An adjustment screw 246 may be provided in the conduit leading from the bellows transducer to the intake manifold for adjusting the effective size of that conduit and hence the time response characteristics of the bellows 244 to the intake manifold vacuum as should be apparent.

The mechanical movement of the bellows 244 is coupled to a magnetic core 248 and produces corresponding movements of this core within an electrical coil 250. The coil 250 is connected as part of a conventional Colpitts oscillator circuit 252 whose frequency of oscillation is thus dependent upon the effective inductance of the coil 250. The effective inductance of the coil 250 is in turn controlled by the positioning of the magnetic core 248 as should be apparent. Accordingly, the output frequency of oscillator 252 is dependent upon the intake manifold vacuum.

As with the engine's speed-voltage situation previously discussed, what is now needed is some means to convert the frequency of oscillator 252 into a proportional voltage. A circuit such as that shown at 12 in FIG. 6 could be utilized or, another type of conventional frequency to voltage conversion circuit 254 may be utilized as shown in FIG. 6. Here, the variable frequency (in dependence upon intake manifold vacuum) output signal from the oscillator 252 is processed and rectified to result in a voltage proportional to the input frequency for use as the intake manifold vacuum voltage on line 206.

Now that the exemplary apparatus shown in FIG. 6 for generating the signals on lines 200, 202, 202a, 204 and 206 have been explained in detail, the remaining apparatus for utilizing these signals and deriving correctly timed ignition and fuel injection pulses will be described in more detail.

In the exemplary embodiment of a four-cylinder internal combustion engine, as referred to FIG. 6 and FIG. 9, it is desired to fire the spark plugs 7a, 7b, 7c and 7d as well as the fuel injection valves 6a, 6b, 6c and 6d in the appropriate sequence and at the appropriate time during each complete engine cycle. That is, assuming that the cylinders are to fire in the sequence a, b, c and d, then at the beginning of a new engine cycle, just before the intake valve opens in cylinder a, the fuel injection valve 6a is to be actuated. Thereafter, at the appropriate time in the compression cycle for cylinder a, the spark plug 7a is to be fired. Similar sequences are to take place in cylinders b, c and d as should be apparent. Of course, as previously explained, the precise timing of this sequence of events is preferably varied in dependence upon the engine's speed and/or intake manifold vacuum to insure proper fuel injection and combustion in each of the respective cylinders. The exact parameters for such timing correction factors will vary of course depending upon the particular engine under consideration. However, the considerations involved in selecting the proper parameters for any given engine will be apparent to those skilled in the art.

Assuming that such parameters have been taken into account, it will then be known exactly at what crank angle of the engine the ignition and fuel injection are desired in each of the respective cylinders. Since there is one crank angle pulse for each of the 720° in any given complete engine cycle, it then becomes possible to precisely locate any particular crank angle position of the engine by merely counting crank angle pulses as should now be apparent. Of course, more or less than 720 pulses per complete engine cycle could be used so long as the counting operation takes into account the total number of crank angle pulses occurring over one complete engine cycle.

That is, for the time being ignoring the variations desired with respect to the engine speed and intake manifold vacuum, one merely has to count out a predetermined number of crank angle pulses occurring after the given reset pulse to determine the nominal time when the desired ignition or fuel injection is to take place in any given cylinder. Furthermore, a desired adjustment or variation of this nominal timing may be achieved by changing the number of counts utilized for such determinations as a desired function of either the engine's speed and/or its intake manifold vacuum.

Each of the cylinders a, b, c and d has two counters uniquely associated therewith for counting out a predetermined number of crank angle pulses corresponding to the desired ignition and fuel injection timing respectively for that particular cylinder. For instance, referring to FIG. 6 cylinder a has a counter 260a in the ignition correction circuit 15 for counting out a predetermined number of crank angle pulses input thereto over line 200 after being reset by reset pulse over line 202. When this predetermined number of crank angle pulses have been counted by counter 260a, an output is delivered over line 262a into a high voltage producing circuit 264a to cause the firing of spark plug 7a. The particular predetermined number counted out by counter 260a before producing the output on line 262a may be made variable by the counter setting circuit 266 which uses inputs from both lines 204 and 206 to cause changes in the predetermined number used for counting in the counter 260 (260a) in the ignition correction circuit 15 when reset pulse on line 202a is applied as shown in FIG. 6. The high voltage producing circuit 264 (264a) may be of any conventional design desired for taking a low level signal on line 262 and raising it to a high voltage as is required in firing spark plugs and as will be apparent to those in the art. Different predetermined numbers are utilized in each of the other three counters shown in the ignition correction circuit 16 of FIG. 9 to result in the proper firing sequence a, b, c, d in the respectively corresponding cylinders. As just discussed, the exact precise timing of these sequenced ignition outputs is varied by the counter setting circuit 266 as a predetermined desired function of the engine speed voltage on line 204 and of the intake manifold voltage on line 206. Of course, the particular desired functional relationship between the engine speed voltage and the intake manifold voltage and the changes in the predetermined numbers to be counted by the various counters 260 in circuit 15 will vary depending upon the parameters of the particular engine under consideration. As previously discussed, such parameters will be readily appreciated by those skilled in the art.

A similar scheme is utilized in obtaining the desired fuel injection timing and sequencing in the fuel injection correction circuit 13. Once again, a separate counter is provided for each of the respective cylinders with counter 270a for instance being provided for cylinder a. Whenever the predetermined number of crank angle pulses for cylinder a have been counted in counter 270a, an output is presented over line 272a to a pulse width modulation circuit 274a which produces a pulse having a desired pulse width (as will be explained in more detail below) for driving a suitable conventional fuel injection valve driving circuit 276a which, in turn, drives the fuel injector 6a for cylinder a as should now be apparent. The circuits 276 may, for instance, comprise a simple amplifier circuit for producing current of the proper magnitude for use in driving an electromagnetic fuel injection valve as should be apparent to those skilled in the art.

The predetermined number of pulses counted in each of the various counters in circuit 13 is made variable by a counter setting circuit 278 which is similar to the counter setting circuit 266 except that the counter setting circuit 278 utilizes only the engine speed voltage from line 204 as input thereto since the timing of the fuel injection pulses is preferably dependent only upon engine speed in this exemplary embodiment. Of course, if for a particular engine, the fuel injection timing is desired to be made a function of the intake manifold vacuum as well, the counter setting circuit 278 could be modified as should be apparent.

The duration of each fuel injection pulse is preferably a function of both the engine speed-voltage and the intake manifold vacuum voltage. Thus, the respective inputs on lines 204 and 206 are inputted to an injection time setting circuit 280 which controls all of the pulse width modulator circuits 274 in the valve actuation circuit 14. The pulse width modulation circuits 274 might, for example, comprise monostable multivibrators having a period that is dependent upon the output voltage from circuit 280. Circuit 280 may comprise any conventional function generating circuit which generates an appropriate functional relationship between the engine speed voltage on line 204, the intake manifold vacuum voltage on line 206 and the output which is presented to the pulse width modulation circuits.

As should now be apparent, the particular predetermined number for each of the counters will be chosen differently to secure the particular desired timing of the respective fuel injectors and ignition plugs at the proper time within each engine cycle. The desired particular predetermined number is chosen and nominally preset in each of the counters to result in the desired sequencing and timing of the fuel injectors and ignition plugs for the particular engine of interest. Then, the preset predetermined number is varied from its nominal value as a desired function of engine speed and/or intake manifold vacuum as previously discussed to result in appropriate changes of timing as these parameters change for the particular engine of interest. In the exemplary embodiment, the actual timing of the pulses for the ignition circuit is made a function of both engine speed and intake manifold vacuum while the actual timing of the fuel injectors is a function of only engine speed. However, as previously described, the duration (as opposed to the timing) of each of the fuel injection pulses is a function of both engine speed and intake manifold vacuum.

Figure 7:
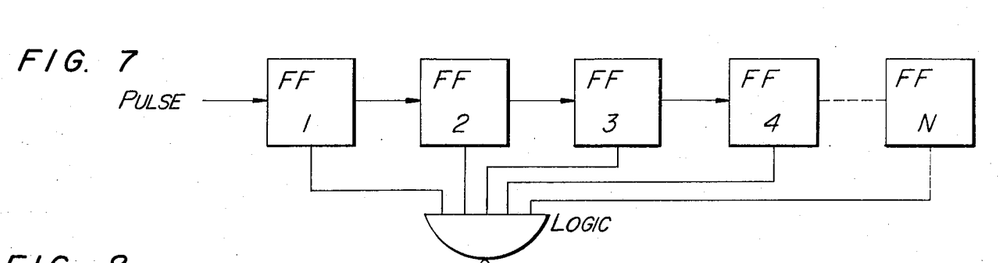
FIGS. 7 and 8 are detailed schematic diagrams of exemplary counter circuits for use in the exemplary embodiment.
Figure 8:
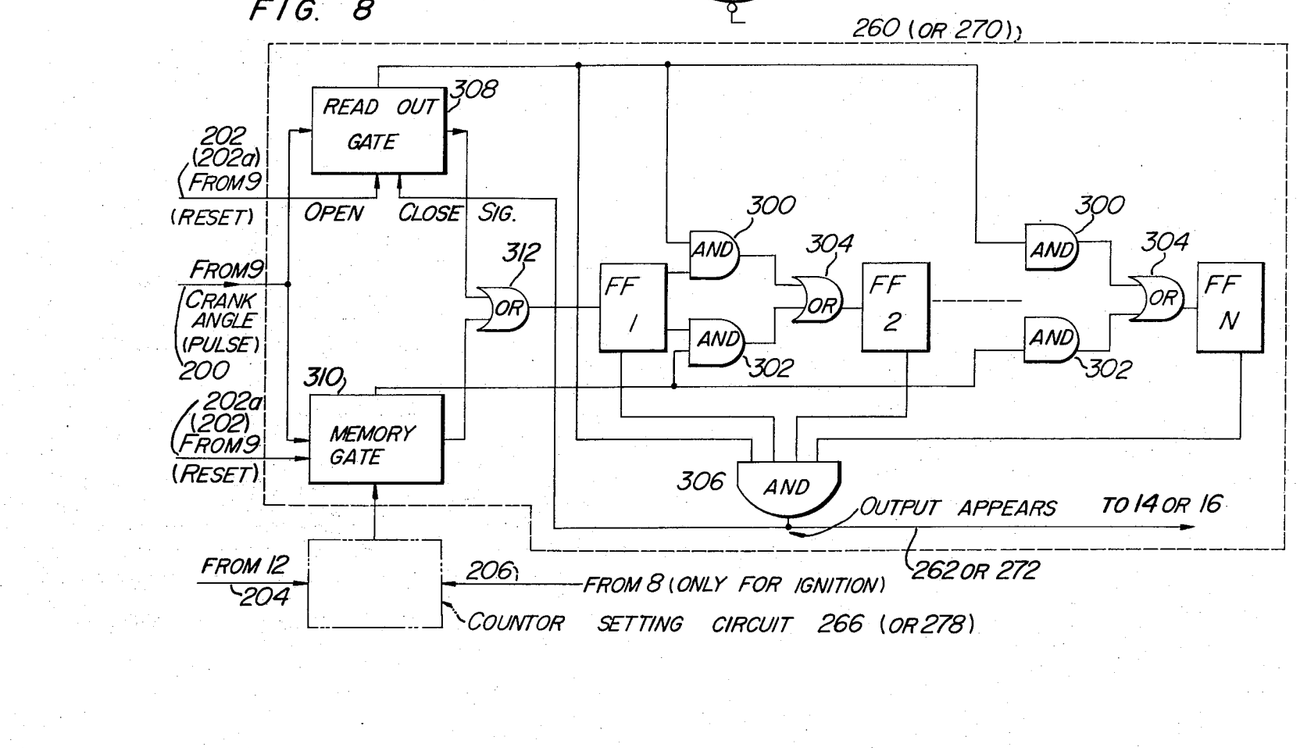

One example of appropriate conventional counting circuitry for use in the exemplary embodiment is shown in more detail at FIGS. 7 and 8. For instance, a typical binary counting chain utilizing flip-flops having logic gating connected to the outputs of the various stages thereof is shown generally in FIG. 7. Flip-flops or bistable multivibrators are themselves well known in the art as is the cascade connection for a series of such bistable elements connected together to form a binary counting chain. The various interconnected flip-flops (shown as FF1, FF2, FF3, FF4 . . . FFN in FIG. 7) take on successive "0" or "1" states as a succession input pulse is presented to the first stage of the counting chain as should be apparent. Accordingly, if the counting chain starts off with all stages in 0 states, the first input pulse will cause FF1 to change to a 1 state. The second input pulse will cause the first flip-flop FF1 to change back to its 0 state and the second flip-flop FF2 to change to its 1 state. Accordingly, the particular permutation of states at any given time represents a binary count of the input pulses as will be apparent. Of course, the maximum capacity of the counter is dependent upon the number $n$ of bistable stages utilized and is, in general, $2^n-1$. To detect any particular permutation of states, the outputs from each of the various stages are connected into appropriate digital logic circuitry which may comprise any desired combination of NAND or AND gates, etc., which are represented diagrammatically as a single NAND gate in FIG. 7. That is, the logic connected to the outputs of the various stages of the counter may be connected to detect any desired predetermined contents of the counter which, in turn, represents a predetermined number of input pulses as will be apparent to those skilled in the art.

An even more specific typical type of counter which might be used as counters 260 or 270 shown in FIG. 6 is shown within dotted lines in FIG. 8. The manner in which this counter is set to count a certain predetermined number of pulses is the same as that employed in many conventional preset counters.

The counter includes a number of flip-flop circuits connected in cascade with AND gates 300 and 302 and OR gate 304 connected between each stage of the flip-flop counters as shown in FIG. 8. Any given flip-flop is caused to transition from its existing state to its other stable state whenever an input is presented thereto from the left hand side as seen in FIG. 8. One of the states cuases an output on the upper line on the right hand side of the flip-flops as seen in FIG. 8 and the opposite state causes an output on the lower line from the right hand side of the flip-flop box shown in FIG. 8. Either one of these two states may be monitored by the connection at the lower side of each flip-flop which is connected to the logic circuitry 306 for detecting a predetermined contents of the counter. AND gates 300 are enabled by the readout gate 308 while the AND gates 302 are enabled by the memory gate 310. Of course, the OR gates 304 pass an output from either one of the respectively associated AND gates 300 or 302 as will be apparent.

The crank angle pulses on line 200 are inputted to both the readout gate 308 and the memory gate 310. The readout gate is opened by the reset signal on line 202. As those in the art will appreciate, when the readout gate 308 is opened and AND gates 300 are enabled, the flip-flop counting chain will count in a first direction (which may be considered descending) and when the memory gate 310 is opened by the reset signal on line 202a causing AND gates 302 to be enabled, the counting chain will count in the opposite direction (which may be considered ascending). As will be appreciated, the basic counter chain shown is a typical conventional reversible binary counting chain which may count either "up" or "down" depending upon whether the gates 302 have been enabled or the gates 300 have been enabled respectively as will be apparent to those skilled in the art.

In the exemplary embodiment, the logic circuitry 306 (exemplified by an AND) is connected to detect a 0 counter contents. The counter is first counted up to a contents corresponding to the desired predetermined number by passing crank angle pulses through the memory gate 310 and enabling the AND gates 302 as previously discussed. When the predetermined number of pulses have been counted, the memory gate 310 is closed and the counter is then primed for a subsequent cycle of operation. Whenever the next reset pulse occurs on line 202, the readout gate 308 will be opened thus enabling AND gates 300 and causing the counter chain to count down. Of course, it will take the same number of pulses to count the counter back down to a 0 content as were previously passed by the memory gate 310 in the priming operation just discussed. Whenever the logic circuitry 306 detects the 0 counter contents this is an indication of the fact that the counter has been counted down by the same predetermined number of pulses and an output is then presented on line 320 which is inputted to the desired injection or ignition signal processing channels as depicted in elements 14 or 16 in FIG. 6.

The memory gate 310 is normally closed and is opened for a certain time period as determined by the engine speed (in the case of fuel injection timing) and by both engine speed and manifold intake vacuum (in the case of ignition timing) when reset pulse 202a is applied. The counter setting circuits 266 and/or 278 which produce the memory gate opening voltage as a function of engine speed and/or intake manifold vacuum may be of any conventional design for producing the desired functional relationship between intake manifold vacuum and/or engine speed and the ignition and/or injection timing appropriate to the particular engine of interest utilizing parameters characteristic of that particular engine as will be apparent to those in the art. Any circuit for combining the input voltages from lines 204 and/or 206 and producing an appropriate gate opening voltage have a voltage value proportional to the appropriate functional relationship therebetween for opening the memory gate 310 is appropriate for use as the counter setting circuits 266 or 278 as should be apparent.

A simplified example will be given to explain the operation of FIG. 8 in more detail. For example, assuming the number of pulses corresponding to the particular predetermined number is 4 for the particular counter under consideration (corresponding to a particular cylinder's ignition or fuel injection timing) which takes into account both the nominal value for proper sequencing and the changes thereto as may be appropriate depending upon the instantaneous engine speed voltage on line 204 and/or the intake manifold voltage on line 206. In this case, the memory gate 310 will be opened, when a reset pulse is applied from line 202a, to pass four crank angle pulses from line 200 through the memory gate 310, through the OR gate 312 and into the flip-flop counting chain. Since gates 302 are enabled, the counting chain will count in ascending order. Assuming the flip-flops FF1, FF2, FF3 . . . are all in a 0 state to begin with, the first pulse will cause FF1 to change state to a "1." The second input pulse will cause the first flip-flop to change back to its 0 state and the second flip-flop to change to its 1 state. The third pulse will cause the first flip-flop to change to its 1 state (thus resulting in both FF1 and FF2 being in their 1 states simultaneously). And the fourth pulse will cause FF1 and FF2 to change to their 0 states and FF3 to change to its 1 state. Accordingly, the net result is a counter content of binary states "001 . . . " for the various flip-flop stages of the counter corresponding to the four input pulses. Of course, since we have assumed that the number 4 is the predetermined number in this simplified example, after the fourth pulse has been passed by the memory gate 310, this gate will close (because the memory gate is opened proportionally to the voltage from the counter setting circuit 266 or 278) thus causing the counter contents to remain static temporarily at the contents preset therein by the memory gate 310 being opened for the predetermined number of pulses as just discussed.

Thereafter, after the next reset pulse on line 202 occurs the readout gate 308 will be opened to permit crank angle pulses 200 to pass therethrough and through OR gate 312 to count the counter stages downwardly. That is, the first pulse passed by the readout gate 308 will cause the flip-flops to regress to a contents of "110 . . . ." The second pulse will cause the counter to regress to the contents of "010 . . . ". The third pulse will cause the counter to regress even to the contents of "100 . . . ". Finally, the fourth pulse passed by the readout gate 308 will cause the counter to regress to its initial 0 contents whereupon the AND or other logic circuitry 306 will be enabled to pass an output along lines 262 or 272 to the fuel injection or ignition plug output circuits 14 or 16 respectively and to then also close the readout gate 308. After an appropriate time interval, in proportion to the voltage from the counter setting circuit 266 or 278 the memory gate 310 will be opened again and pass a predetermined number of clock pulses to count the counter up again to its predetermined contents in readiness for another operational cycle. Of course, the predetermined number of pulses passed by the memory gate 310 is dependent upon the engine speed signal on line 204 and/or the intake manifold vacuum signal on line 206 in the particular desired functional relationship corresponding to the particular engine of interest.

Figure 10:
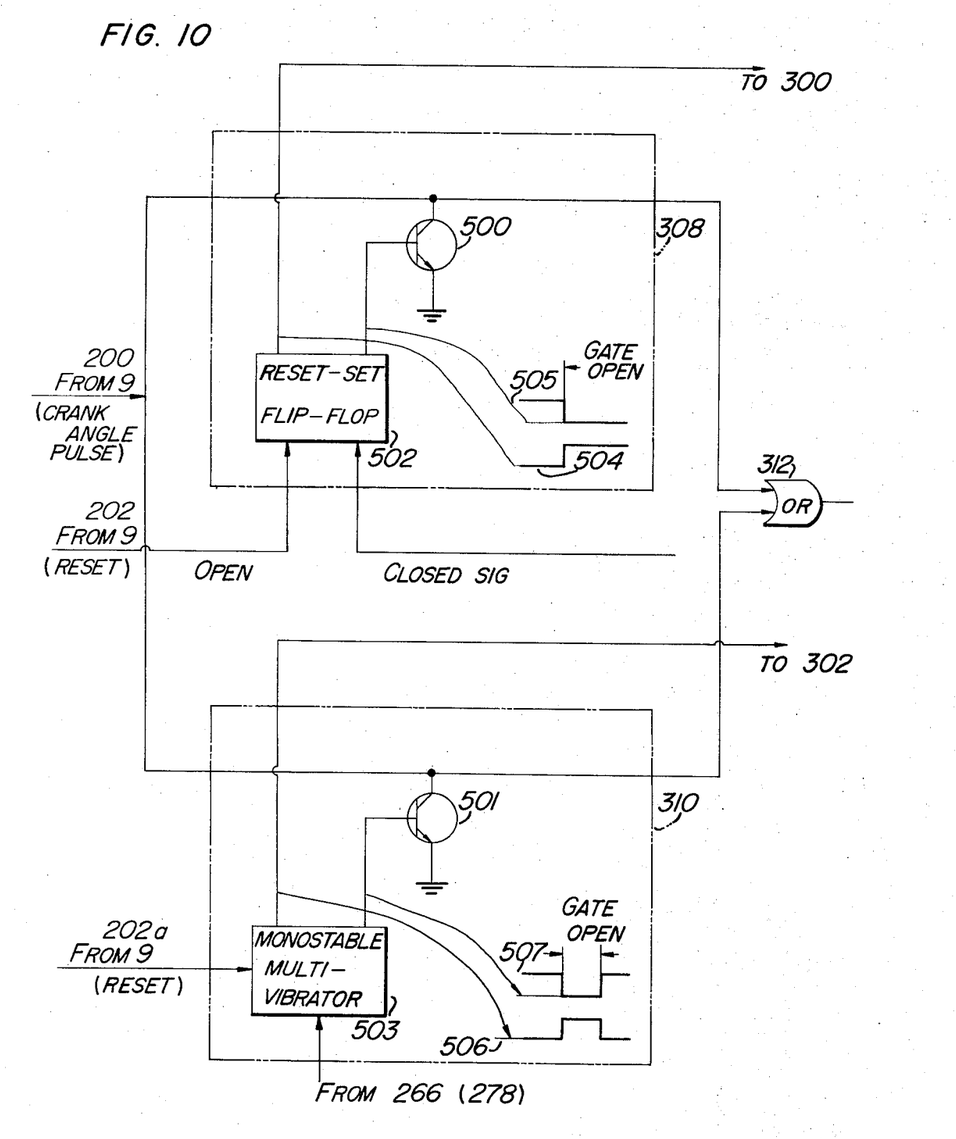
FIG. 10 is a more detailed schematic diagram which shows a part of the diagram of FIG. 8.

FIG. 10 shows more in detail the readout gate 308 and memory gate 310 of FIG. 8. The read-out gate 308 comprises a transistor 500 and a well known reset-set flip-flop circuit 502. The flip-flop circuit 502 receives a reset signal from pulse generator 9 and a signal from AND circuit 306, and upon receiving the reset signal the flip-flop circuit 502 produces a voltage signal on a line 504 whereas when a signal is applied from the AND circuit 306 the voltage signal on the line 504 is removed and another voltage signal is produced on a line 505. In other words the signals on the lines 504 and 505 alternate depending upon the input signals from the pulse generator 9 and AND circuit 306. The base of the transistor 500 is connected to the line 505 while the collector is connected to a line 200 through which line a crank angle pulse is applied from the pulse generator 9. The collector is also connected to an OR circuit 312 and the emitter is grounded. Accordingly, as far as the voltage signal appears on the line 505, the crank angle pulse is never applied to the OR circuit 312, in other words the read-out gate 308 is in closed condition. The memory gate 310, on the other hand, comprises a well known monostable multivibrator 503 and a transistor 501. When the multivibrator 503 is triggered by a reset signal from the pulse generator 9, it produces on a line 506 a pulse signal which is proportional to the magnitude of voltage produced by counter setting circuits 266 and/or 278 as a function of engine speed and/or intake manifold vacuum. The base of the transistor 501 is connected to the multivibrator 503 through the line 507, and the collector is connected to the line 200 through which a crank angle signal is applied from the pulse generator 9 and the collector is also connected to the OR circuit 312. The emitter of the transistor 501 is grounded. Consequently, during such a period when a pulse signal is not produced on the line 506, a voltage signal is produced on the line 507. The crank angle pulse is not applied to the OR circuit 312 as far as the voltage signal is produced on the line 507.

Although only one exemplary embodiment of this invention has been described in detail, those of ordinary skill in the art will readily appreciate that many changes and modifications can be made to the exemplary embodiment without in any way departing from the basic spirit of the invention. Accordingly, all such modifications are intended to be included within the scope of this invention.

What is claimed is:

1. An electric control apparatus for internal combustion engines having fuel injection valves, said apparatus, comprising:

a pulse generator for sequentially generating electrical output pulses throughout each cycle of the engine and in synchronism with the revolution of the engine, said electrical output pulses containing a reference pulse for each complete engine cycle having a recognizable characteristic distinguishing it from other electrical pulses generated throughout the remainder of the engine cycle, an engine speed-voltage conversion circuit means having an input connected to the output of said pulse generator for generating an output voltage magnitude representative of the engine speed in response to the electrical output pulses of said pulse generator, a plurality of counting circuits each connected to said pulse generator and comprising a separate counting circuit for each fuel injection valve and, each of which counting circuits respectively corresponds to an electromagnetic fuel injection valve provided in each cylinder of the engine, and the inputs of each counting circuit being connected to receive the output pulses, for counting the output pulses from said pulses generator and for sequentially triggering actuation starting times of the respectively corresponding fuel injection valves as a function of the individual counter contents, an injection timing correction circuit means for adjusting the relative actuation starting times of the fuel injection valves and connected to each of said counting circuits and to said engine speed voltage conversion circuit means for controlling the effective counting capacity of said counting circuits and for thus determining the relative timing at which said electromagnetic fuel injection valves are to be sequentially energized, the energization of said electromagnetic fuel injection valves being initiated when the respectively corresponding one of said counting circuits therefor has counted a respectively corresponding predetermined number of said output pulses said respectively corresponding predetermined numbers being controlled by said injection timing correction circuit, and a pulse width modulating and driving circuit means connected to the output of each counting circuit for generating an electromagnetic valve driving pulse having a time duration related to the time duration during which the fuel is desired to be injected by the corresponding electromagnetic valve, said duration pulse being triggered responsively to a starting output signal from the respectively corresponding counting circuit.

2. An electric control apparatus for internal combustion engines, as set forth in claim 1, further comprising:

a negative pressure voltage conversion circuit means associated with said engine and adapted for converting the negative pressure of an engine intake manifold into a voltage corresponding thereto, a plurality of further counting circuits connected to said pulse generator, each further counting circuit respectively corresponding to an ignition plug disposed in association with a corresponding cylinder, an angular-advance-of-ignition correction circuit means connected to said negative pressure voltage conversion circuit means and to said engine speed voltage conversion circuit means to control the effective counting capacity of said further counting circuits for thus determining the relative timing at which said ignition plugs are to be ignited, the ignition of each of said ignition plugs being made when a respectively corresponding one of said counting circuits therefor counts a respectively corresponding predetermined number of output pulses from said pulse generator, and an ignition plug actuation circuit connected to an output each of said further counting circuits for generating a driving output signal to a corresponding ignition plug in response to said output of said further counting circuit.

3. An electric control apparatus for internal combustion engines, as set forth in claim 2 wherein:

the injection timing correction circuit means is connected to the engine speed-voltage conversion circuit means for controlling the predetermined number of output pulses to be counted by the counting circuits, the angular advance-of-ignition correction circuit means being connected to the engine speed voltage conversion circuit means and to the negative pressure voltage conversion circuit means for controlling the predetermined number of output pulses to be counted by said further counting circuits, and the pulse width modulating and driving circuit being connected to both of the voltage conversion circuit means for controlling the width of the pulse generated in accordance with both the output signals of said negative pressure-voltage conversion circuit means and said engine speed voltage conversion circuit means.

4. An electrical control circuit for an internal combustion engine, said circuit comprising:

pulse generator means adapted to cooperate with said engine for sequentially generating electrical pulses in synchronism with engine revolutions, said electrical pulses including first timing pulses generated at uniform crank angle intervals of said engine revolutions and second reference pulses generated only at one predetermined point in each engine operating cycle, pressure-to-voltage conversion means adapted to cooperate with said engine for converting negative pressure of an engine intake manifold of said engine into a corresponding electrical voltage having a magnitude representing the magnitude of the existing manifold pressure, frequency-to-voltage conversion means connected to said pulse generator means for converting the frequency of said electrical pulses into a corresponding electrical voltage having a magnitude representing the magnitude of the engine speed, a plurality of counting circuit means comprising a separate counter corresponding to each cylinder of said engine and connected to the output of said pulse generator means for counting respectively predetermined numbers of said electrical pulses occurring in any given engine cycle and for producing trigger output pulses to trigger an event related to combustion in its respectively corresponding associated cylinder when said predetermined number of pulses have been counted, and correction circuit means connected to said counting circuit means for adjusting the relative timing of said event in each cylinder by controlling the magnitude of said predetermined number in accordance with at least one of the electrical output signals from said presure-to-voltage conversion means and said frequency-to-voltage conversion means and thereby to correct timing of said event for changes in engine operating conditions.

5. An electrical control circuit as in claim 4 for controlling fuel injection by electromagnetic fuel injection valves in each engine cylinder wherein an injection timing correction circuit comprises said plurality of counting circuit means for determining the time at which said electromagnetic injection valves are triggered, said predetermined number in each counter being controlled by the electrical signal representing engine speed, and further comprising:

valve actuation means connected to each of said counter circuit means and to said pressure-to-voltage conversion means for applying a fuel injection pulse whose pulse width is determined by the manifold pressure and whose time of occurrence is determined by the trigger output signal from the respectively associated counter circuit means.

6. An electrical control circuit as in claim 4 for controlling ignition timing by ignition plugs mounted in each engine cylinder wherein an angular-advance-of-ignition correction circuit comprises said plurality of counting circuit means for determining the time at which said ignition plugs are ignited, said predetermined number in each counter being controlled by both the electrical signal representing engine speed and the electrical signal representing manifold pressure, and further comprising:

ignition plug actuation means connected to each of said counting circuit means for firing the respectively corresponding ignition plug at a time determined by the trigger output signal from the respectively associated counting circuit means.

7. An electrical control circuit as in claim 5 for controlling both fuel injection and ignition timing further comprising:

a further plurality of counting circuit means, each corresponding to a cylinder of said engine and connected to said pulse generator means for counting a further predetermined number of said electrical pulses in any given engine cycle and connected to trigger an ignition plug actuation means connected thereto for causing combustion in a corresponding engine cylinder at a time determined by the respectively associated further counting circuit means, and an ignition correction circuit means connected to control said further predetermined number in each further counter in dependence upon both the electrical signal representing engine speed and the electrical signal representing manifold pressure.

8. An electric control apparatus for use with electromagnetic fuel injection valves and ignition plugs in an internal combustion engine, said apparatus comprising:

a negative pressure-voltage conversion circuit adapted to cooperate with said engine for generating a voltage signal corresponding to the negative pressure of an intake manifold of the engine, a pulse generator for sequentially generating electrical pulse signals, the number of said pulse signals produced during each engine cycle being representative of the crank angle degrees in each cycle of the engine, said generator including means for producing a reference electrical pulse at a specific crank angle position of the engine during each engine cycle.

a plurality of counting circuits, each counting circuit respectively corresponding to an electromagnetic fuel injection valve provided in a respectively corresponding cylinder of the engine, each of said counting circuits being connected to said pulse generator for counting the electrical pulse signals therefrom and for generating a trigger signal when a respectively corresponding predetermined number of such electrical pulse signals have been counted, and electromagnetic fuel injection valve actuation means connected to each of said counting circuits and to said negative pressure-voltage conversion circuit for generating a driving pulse to drive a corresponding one of said electromagnetic fuel injection valves in response to the trigger signal of the respectively corresponding counting circuit, and including means for controlling the pulse width of said driving pulse in accordance with the voltage signal from said negative pressure-voltage conversion circuit.

9. An electric control apparatus as set forth in claim 8, further comprising:

an engine speed-voltage conversion circuit connected to said pulse generator for converting the pulse signals into a further voltage signal corresponding to engine speed, said valve actuation means also being connected to said engine speed-voltage conversion circuit and adapted so that the counting operation of each of said counting circuits is also controlled by said engine speed-voltage conversion circuit to count a respectively corresponding predetermined number of electrical pulse signals, which number is a function of the engine speed.

10. An electric control apparatus as set forth in claim 8, further comprising:

a plurality of further counting circuits, each respectively corresponding to an ignition plug disposed in association with a respectively corresponding cylinder of said engine, each further counting circuit being connected to said pulse generator for counting the electrical pulse signals and for generating a further trigger signal when a respectively corresponding predetermined number of pulse signals have been counted, and an ignition plug actuation circuit means connected to each further counting circuit for driving the respectively associated ignition plug in response to the further trigger signal of the respectively corresponding further counting circuit.

11. An electric control apparatus as set forth in claim 10, further comprising:

an engine speed-voltage conversion circuit connected to said pulse generator for converting the electrical pulse signals into a further voltage signal corresponding to the engine speed, said plug actuation means also being connected to said negative pressure-voltage conversion circuit and to said engine speed-voltage conversion circuit and adapted so that the counting operation of said further counting circuits is controlled both by said negative pressure-voltage conversion circuit and by said engine speed-voltage conversion circuit to count a respectively corresponding predetermined number of electrical pulse signals which number is a function both of the engine speed and of the negative pressure of the engine intake manifold.

* * * * *